(12) United States Patent
Wang et al.

(10) Patent No.: US 10,185,150 B2
(45) Date of Patent: Jan. 22, 2019

(54) NARROW ANGLE LIGHT ENGINE

(71) Applicant: GLO AB, Lund (SE)

(72) Inventors: Sheng-Min Wang, Taipei (TW);
Hui-Yu Huang, Taipei (TW); Michael Jansen, Palo Alto, CA (US)

(73) Assignee: GLO AB, Lund (SE)

( * ) Notice: Subject to any disclaimer, the term of this patent is extended or adjusted under 35 U.S.C. 154(b) by 0 days.

(21) Appl. No.: 15/605,105

(22) Filed: May 25, 2017

(65) Prior Publication Data

US 2017/0343186 A1    Nov. 30, 2017

Related U.S. Application Data

(60) Provisional application No. 62/341,818, filed on May 26, 2016, provisional application No. 62/437,260, filed on Dec. 21, 2016.

(51) Int. Cl.
| | | |
|---|---|---|
| *G02B 27/01* | (2006.01) | |
| *G02B 27/30* | (2006.01) | |
| *G02B 27/28* | (2006.01) | |
| *G02B 5/30* | (2006.01) | |

(52) U.S. Cl.
CPC ..... *G02B 27/0172* (2013.01); *G02B 27/0101* (2013.01); *G02B 27/283* (2013.01); *G02B 27/30* (2013.01); *G02B 5/30* (2013.01); *G02B 2027/0112* (2013.01)

(58) Field of Classification Search
CPC . F21V 5/045; F21V 9/14; F21V 5/007; F21V 7/09; G02B 6/0046; G02B 27/0172; G02B 6/0056; G02B 6/0036; G02B 6/003; G02B 27/0101; G02B 27/283; G02B 27/30; G02B 5/30; G02B 2027/0112

See application file for complete search history.

(56) References Cited

U.S. PATENT DOCUMENTS

| | | | | |
|---|---|---|---|---|
| 8,873,148 | B1 * | 10/2014 | Gupta | G02B 27/01 359/624 |
| 2007/0176187 | A1 * | 8/2007 | Iwanaga | F21K 9/00 257/79 |
| 2008/0296589 | A1 * | 12/2008 | Speier | H01L 33/642 257/82 |

(Continued)

FOREIGN PATENT DOCUMENTS

| | | |
|---|---|---|
| WO | WO2016025397 A1 | 2/2016 |
| WO | WO2016100657 A2 | 6/2016 |
| WO | WO2016100662 A1 | 6/2016 |

OTHER PUBLICATIONS

Jansen, M. et al., "LED Backlight Unit with Separately and Independently Dimmable Zones for a Liquid Crystal Display," U.S. Appl. No. 15/429,338, filed Feb. 10, 2017.

(Continued)

*Primary Examiner* — Donald L Raleigh
(74) *Attorney, Agent, or Firm* — The Marbury Law Group PLLC (57) ABSTRACT

A light engine includes a housing containing a rectangular aperture, a polarizer disposed in the housing facing the aperture, a light emitting diode (LED) array disposed in the housing, and a light guide configured to guide light emitted from the LED array toward the aperture, such that light is emitted through the aperture.

22 Claims, 8 Drawing Sheets

(56) References Cited

U.S. PATENT DOCUMENTS

| | | | | |
|---|---|---|---|---|
| 2010/0038660 A1* | 2/2010 | Shuja | ............... | H01L 33/648 |
| | | | | 257/98 |
| 2012/0162996 A1* | 6/2012 | Ikeda | ............... | G03B 21/14 |
| | | | | 362/311.02 |
| 2013/0193592 A1* | 8/2013 | Peil | ............... | F21K 9/00 |
| | | | | 257/791 |
| 2013/0207887 A1 | 8/2013 | Raffle et al. | | |
| 2014/0286019 A1* | 9/2014 | Araki | ............... | G02B 19/0023 |
| | | | | 362/311.09 |
| 2015/0301267 A1* | 10/2015 | Ouderkirk | ............... | G02B 6/0028 |
| | | | | 362/607 |

OTHER PUBLICATIONS

Jansen, M. et al., "Light Bar Containing Symmetric LED Placement and Method of Making Thereof," U.S. Appl. No. 15/592,405, filed May 11, 2017.

* cited by examiner

| LED size / LED pitch | 10 μm | 15 μm | 20 μm |
|---|---|---|---|
| 1:1 | 10.2 | 10.8 | 12.4 |
| 1:1.5 | 10.6 | 11.8 | 14.3 |
| 1:2 | 11.4 | 13.8 | 18.1 |

Beam Angle

FIG. 7B

| LED size / LED pitch | 10 μm | 15 μm | 20 μm |
|---|---|---|---|
| 1:1 | 26,982 | 23,584 | 18,462 |
| 1:1.5 | 24,530 | 19,368 | 14,894 |
| 1:2 | 21,082 | 15,604 | 11,548 |

Converting Ratio

NARROW ANGLE LIGHT ENGINE

RELATED APPLICATION

This application claims priority to U.S. Provisional Application Nos. 62/341,818, filed May 26, 2016 and 62/437,260, filed Dec. 21, 2016, the entire contents of which are incorporated herein, by reference.

FIELD

The embodiments of the invention are directed generally to semiconductor light emitting devices and specifically to a narrow angle light engine.

BACKGROUND

Light emitting devices, such as light emitting diodes (LEDs), are used in electronic displays, such as in light engines of liquid crystal displays in laptops or LED televisions. Conventional light engines are fabricated by mounting LEDs to a substrate, encapsulating the mounted LEDs and then optically coupling the encapsulated LEDs to an optical waveguide.

SUMMARY

Various embodiment relate to a light engine that includes a housing containing a rectangular aperture, a polarizer disposed in the housing facing the aperture, a light emitting diode (LED) array disposed in the housing, and a light guide configured to guide light emitted from the LED array toward the aperture, such that light is emitted through the aperture.

DETAILED DESCRIPTION

As stated above, the present disclosure is directed to a narrow angle light engine, the various aspects of which are described below. Throughout the drawings, like elements are described by the same reference numerals. The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure.

Currently, a variety of miniaturized display devices such as smart glasses, are being developed. However, conventional light engines generally have a wide light emitting angle, and thus, are difficult to implement in miniaturized display apparatuses. Accordingly, there is a need for new light engines that have a narrow angle of light emission.

Prior art light engines typically have a wide emitting angle and a circular or oval cross sectional shape of the emitted light beam. However, the present inventors realized that a narrow emitting angle light engine is desired for smaller display and projection devices. Furthermore, the present inventors realized that a number of display or projection devices have a rectangular display or projection area for which the light engine having a rectangular cross sectional beam shape would be desired. Thus, embodiments of the present disclosure provide a narrow angle light engine which has a rectangular cross sectional beam shape.

As used herein, a "light engine" refers to a unit (e.g., back light unit) that provides the function of illumination for projection devices or display devices, such as liquid crystal displays (LCDs) or other devices that display an image by blocking a subset of background illumination from the side or from the back. As used herein, a "light emitting device" can be any device that is capable of emitting light in the visible range (having a wavelength in a range from 400 nm to 800 nm), in the infrared range (having a wavelength in a range from 800 nm to 1 mm), or in the ultraviolet range (having a wavelength is a range from 10 nm to 400 nm). The light emitting devices of the present disclosure include light emitting diodes as known in the art, and particularly the semiconductor light emitting diodes emitting light in the visible range.

As used herein, a "light guide" refers to a unit configured to guide light emitted from at least one light emitting device in a light emitting device assembly in a direction or directions that are substantially different from the initial direction of the light as emitted from the at least one light emitting device. A light guide of the present disclosure may be configured to reflect or scatter light along a direction different from the initial direction of the light as emitted from the at least one light emitting device. In one embodiment, the light guide of the present disclosure includes a light guide plate or prism, such as a wedge shaped triangular prism, and may be configured to reflect light along directions about the surface normal of the bottom surface of the light guide plate, i.e., along directions substantially perpendicular to the bottom surface of the light guide plate or prism. As used herein, a direction is "substantially perpendicular" to another direction if the angle between the two directions is in a range from 75 degrees to 105 degrees.

Figure 1A:
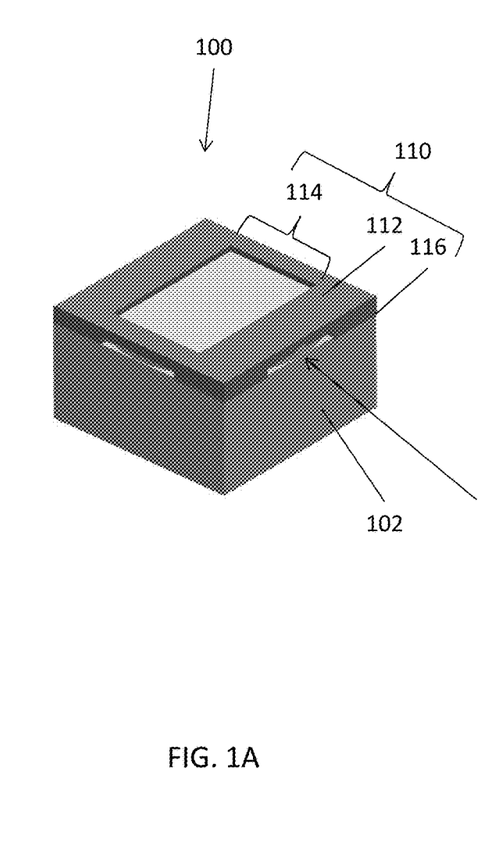
FIG. 1A is a perspective view of a narrow angle light engine, according to various embodiments of the present disclosure.
Figure 1B:
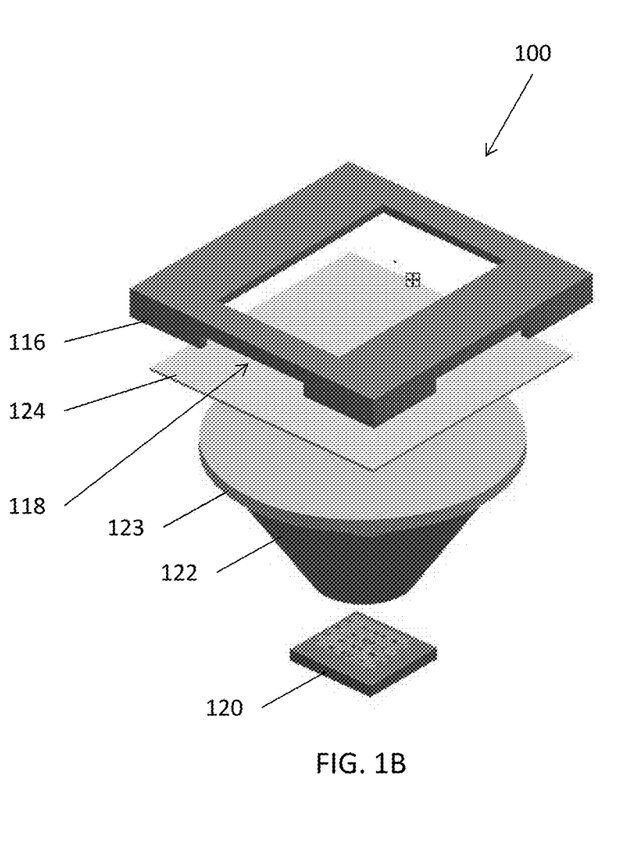
FIG. 1B is an exploded perspective view of selected components of the light engine of FIG. 1A

FIG. 1A is a perspective view of a narrow angle light engine 100, according to various embodiments of the present disclosure. FIG. 1B is an exploded perspective view of selected components of the light engine 100 of FIG. 1A. FIGS. 1A and 1B illustrate a direct lit type light engine 100 in which the light from the light engine passes straight through an exit aperture of the light engine without being turned 90 degrees.

Referring to FIGS. 1A and 1B, the light engine 100 includes a housing 102 and a cover 110 disposed on the housing 102. The housing 102 may have a bottom, sidewalls, and an open top. For example, the housing 102 may be a rectangular box with an open top. The cover 110 includes a main body 112, an aperture 114 formed in the main body 112, and supports 116 that extend from the main body 112. The supports 116 may be generally L-shaped structures disposed at corners of the main body 112. The supports 116 may be separated from one another by openings 118 disposed therebetween. The aperture 114 may be rectangular shaped (e.g., square shaped or non-square shaped), in some embodiments.

The light engine 100 may also include a LED array 120, a light guide 122, and a polarizing sheet 124. The LED array 120 and the light guide 122 may be disposed in the housing 102. The polarizing sheet 124 may be disposed between the cover 110 and the light guide 122, facing the aperture 114. In some embodiments, the polarizing sheet 124 may be rectangular or square-shaped and may be held in position by the supports 116 and/or main body 112 of the cover 110.

The LED array 120 may include LEDs that emit different colors of light. For example, the LED array 120 may include red, green, and blue LEDs, whose combined output appears as white light to a human observer. The LEDs of the array 120 may be arranged in LED clusters that include red, green, and/or blue LEDs. The LEDs and/or clusters may be arranged in a rectangular or square-shaped configuration.

The light guide 122 may be a collimating lens configured to collimate the light emitted from the LED array 120. An upper edge of the light guide 122 may include a lip 123, which may be disposed on an upper edge of the housing 102. In particular, portions of the lip 123 may be disposed in the openings 118 of the cover 110. Collimated light emitted from the light guide 122 may be polarized by the polarizing sheet 124. The cover 110 may operate as a mask, such that a circular light spot emitted from the light guide 122 and polarized by the polarizing sheet 124 is emitted as a rectangular light spot, by passing through the aperture 114.

Figure 2A:
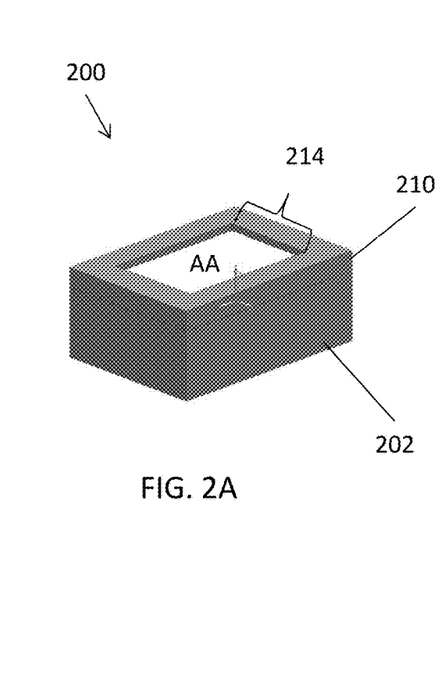
FIG. 2A is a perspective view of a narrow angle light engine, according to various embodiments of the present disclosure.
Figure 2B:
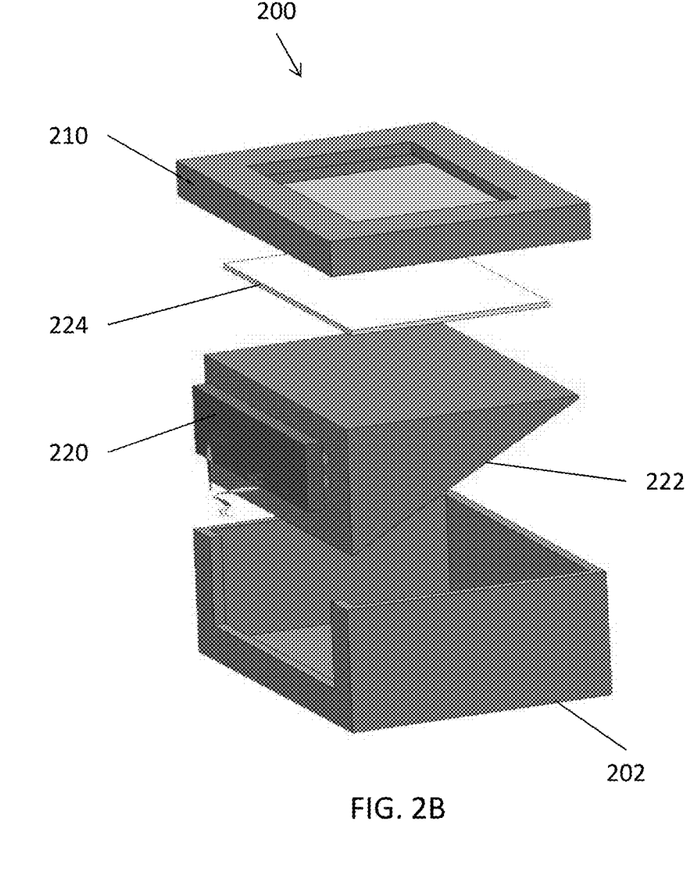
FIG. 2B is an exploded perspective view of components of the light engine of FIG. 2A.
Figure 2C:
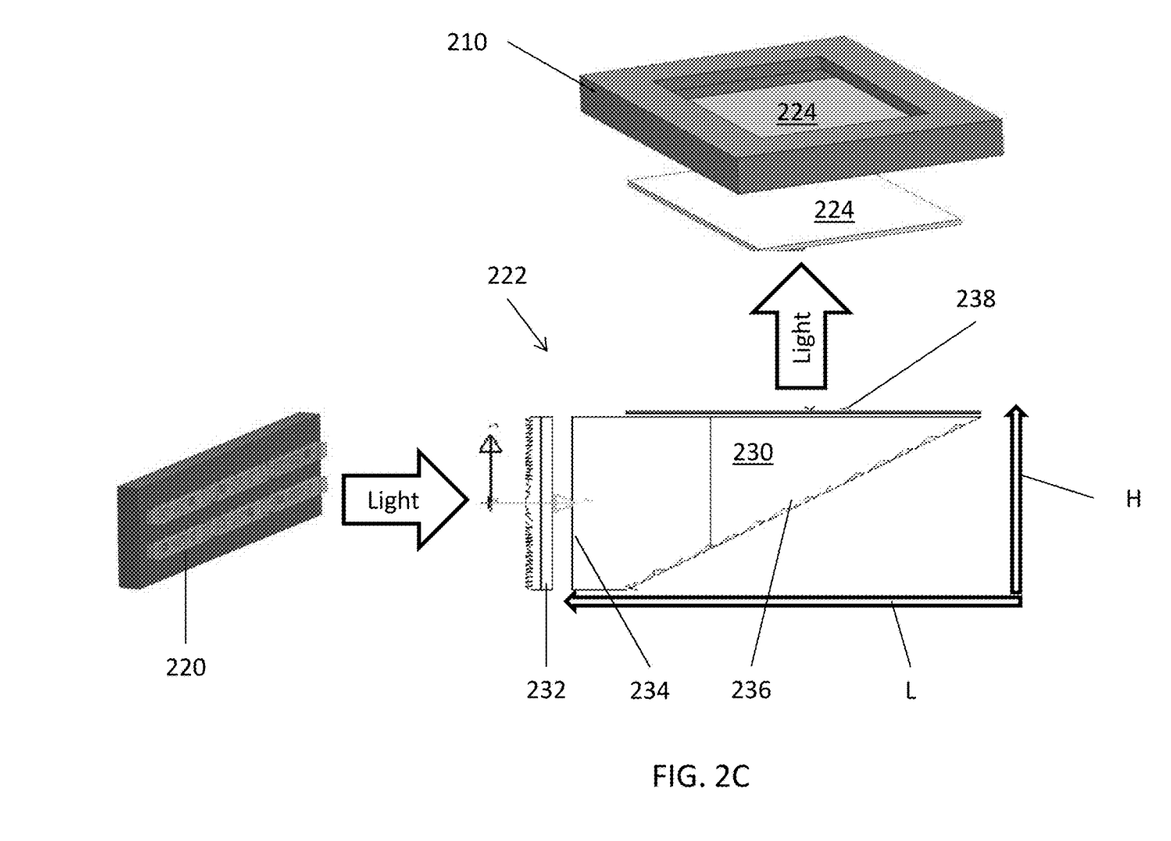
FIG. 2C is an exploded view of selected components of FIG. 2B.

FIG. 2A is a perspective view of a narrow angle light engine 200, according to various embodiments of the present disclosure. FIG. 2B is an exploded perspective view of components of the light engine 200 of FIG. 2A, and FIG. 2C is an exploded view of selected components of FIG. 2B. FIGS. 1A and 1B illustrate an edge lit type light engine 200 in which the light from the light engine is turned by an angle greater than 45 degrees, such as 90 degrees before passing through an exit aperture of the light engine.

Referring to FIGS. 2A and 2B, the light engine 200 includes a housing 202 and a cover 210 disposed on an open end of the housing 202. The cover 210 includes an aperture 214. The aperture 214 may be rectangular shaped (e.g., square shaped or non-square shaped).

The light engine 200 may also include an LED array 220, a light guide 222, and a polarizing sheet 124. The LED array 220 and the light guide 222 may be disposed in the housing 202. For example, the LED array 220 and the light guide 222 may be disposed on and/or attached to sidewalls of the housing 202. The polarizing sheet 224 may be disposed between the cover 210 and the light guide 222, facing the aperture 214. In some embodiments, the polarizing sheet 224 may be rectangular or square-shaped and may be held in position over the light guide 222 by the cover 210.

The LED array 220 may include a rectangular arrangement of LEDs (e.g., LED strips, also known as "light bars") that emit different colors of light, or LED clusters that each includes LEDs that emit different colors of light. For example, the LED array 220 may include red, green, and blue LEDs, whose combined output appears as white light to a human observer. The LEDs of the array 220 may be arranged in clusters that include red, green, and/or blue LEDs. The LEDs and/or clusters of the array 220 may be arranged in a rectangular or square-shaped configuration.

Referring to FIG. 2C, the light guide 222 includes a lens 232 and a wedge shaped triangular prismatic main body 230. The lens 232 may be a reversed Fresnel lens and may be disposed on or adjacent to a first surface 234 of the main body 230. The first surface 234 may be substantially perpendicular to a plane of the polarizing sheet 224. The lens 232 may have a reversed Fresnel structure. In other words, the lens 232 may be configured to collimate light emitted from the LED array 220.

Light collimated by the lens 232 may be emitted to the first surface 234 of the main body 230. The light may then be reflected off a second surface 236 of the main body 230, towards a third surface 238 of the main body 230. The first and third surfaces 234, 238 may be substantially perpendicular to one another. The second surface 236 may include a stepped or indented structure configured to enhance the reflection of the light and/or adjust the path of the reflected light towards the third surface 238. For example, indentations of the second surface may increase the angle of reflection of light incident thereto, as compared to a reflection angle from the second surface 236 if such features were not included. As such, the overall height H of the main body 230 may be reduced and a length L of the main body 230 may be increased.

The third surface 238 may include a coating or surface features (e.g. a roughened surface) configured to enhanced light extraction and/or adjust a light extraction angle. For example, the third surface 238 may have a refractive index that is between a refractive index of the third surface and a refractive index of the polarizing sheet 224.

Light emitted from the third surface 238 may be polarized by the polarizing sheet 224, before being emitted through the aperture 214 of the cover 210. The cover 210 may act as a mask, such that a rectangular or square light spot is emitted from the light engine 200. In other words, the cover 210 may convert an oval-shaped or circular light spot generated by the LED array 220 into a substantially rectangular or square-shaped light spot.

The light engines described herein may provide a relatively narrow emitting angle and a high nit output. The light engines described herein may also have a height "H" shown in FIG. 2C ranging from about 5 mm to about 20 mm, such as about 7 mm to about 13 mm, or about 10 mm or about 12 mm, and may have a length and/or width "L" shown in FIG. 2C ranging from about 10 mm to about 30 mm, such as from about 15 mm to about 25 mm, about 18 mm to about 20 mm.

Figure 3:
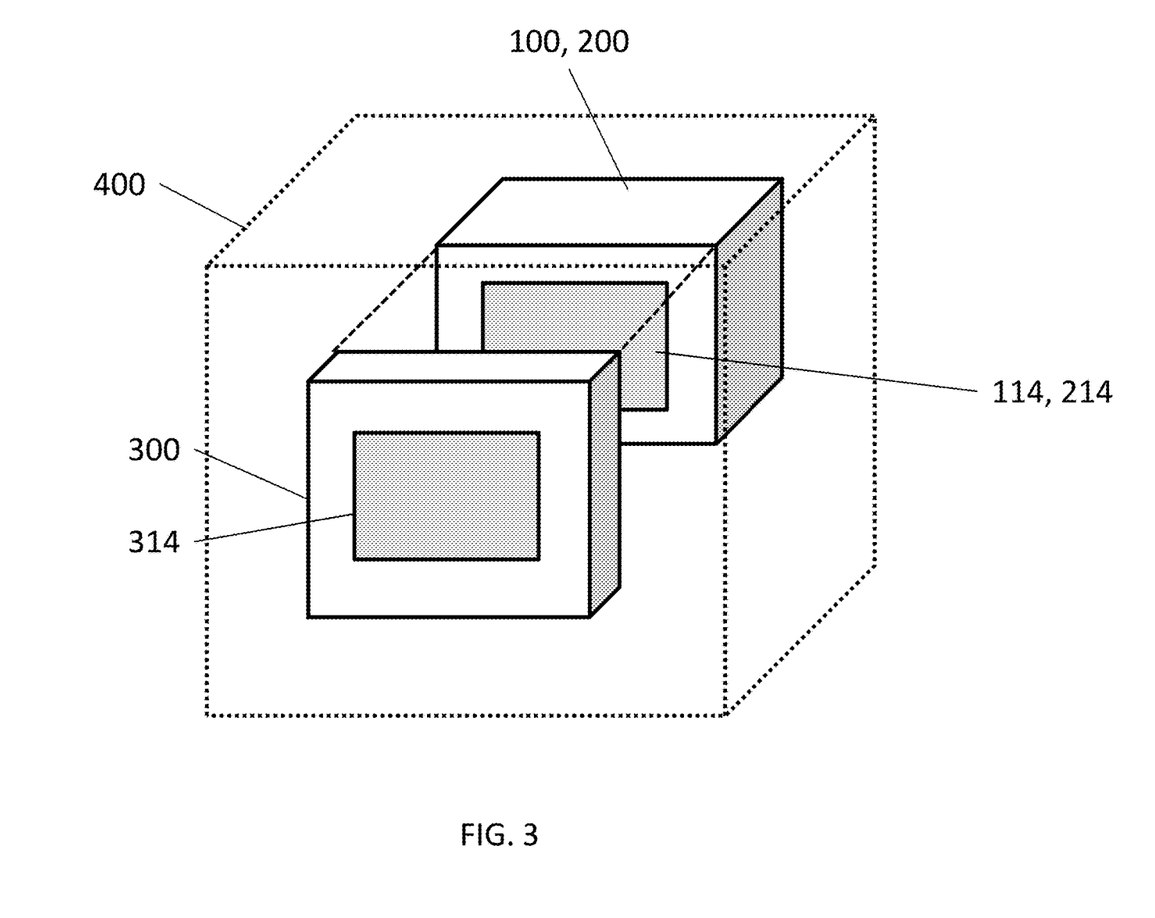
FIG. 3 is an exploded perspective view of a device containing the light engine of FIG. 1A or 2A.

The various light engines of the embodiments of the present disclosure can have a narrow light beam angle which has a rectangular cross sectional beam shape which provide a high nits output. Such light engines may be integrated an imager device 300, such as a liquid crystal on silicon (LCoS) imager, a NEMS (nano-electro-mechanical system) or MEMS (micro-electro-mechanical system) imager, a DLP (digital light processing using micro-mirrors) imager or a LBS (laser beam steering using micro-mirrors) imager in a small size display and projection devices 400 shown in FIG. 3. Accordingly, the light engines may be especially suitable for use as a RGB light source in devices 400 such as a pico-projector, smart glasses, a head-mounted-display such as virtual reality goggles, or the like which have a rectangular (e.g., square or non-square) display or projection area.

Figure 4:
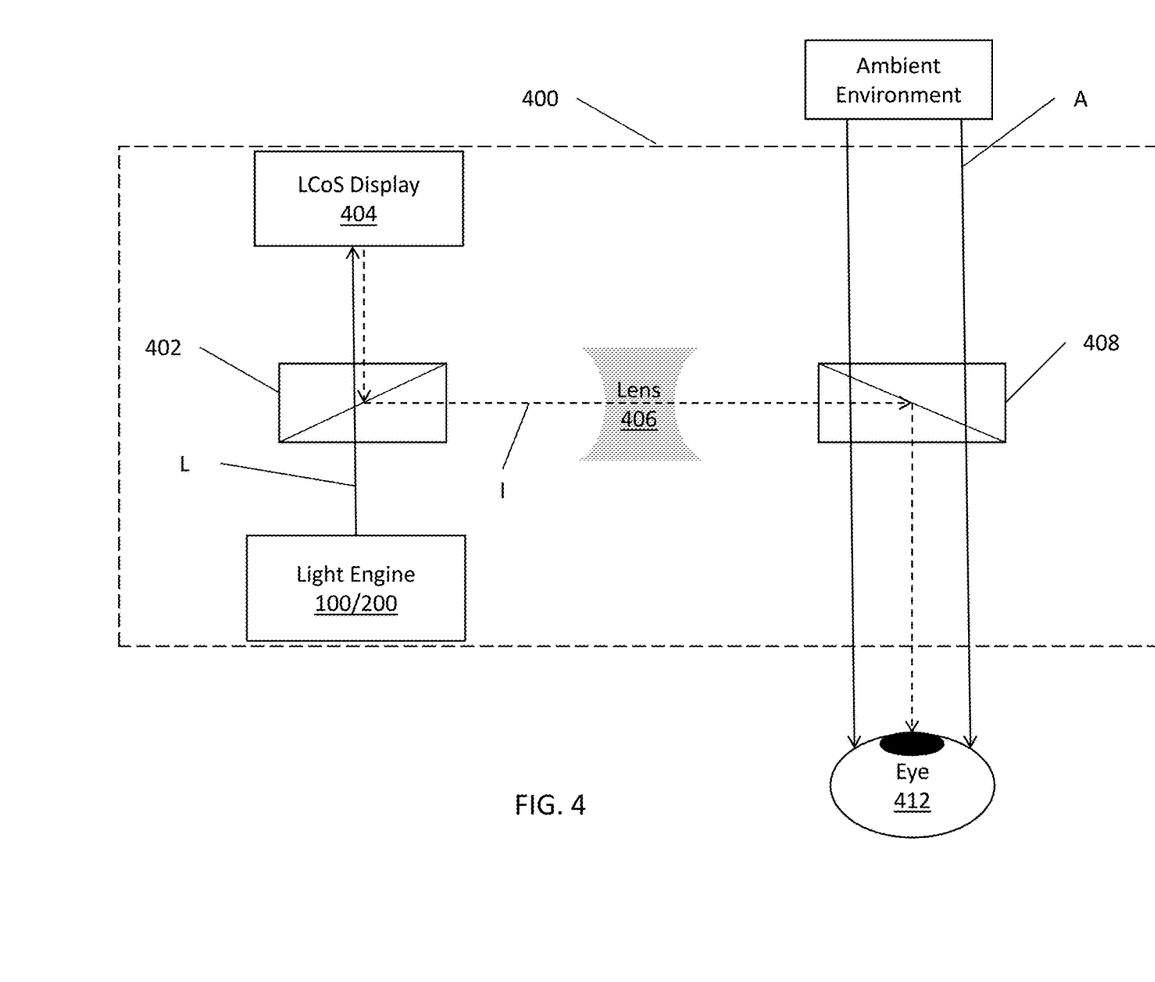
FIG. 4 is a schematic view of a device containing the light engine of FIG. 1A or 2A.

FIG. 4 is a schematic view of an imaging device 400, according to various embodiments of the present disclosure. Referring to FIG. 4, the imaging device 400 includes a narrow emission angle light engine 100 or 200, a first prismatic beam splitter (PBS) 402 and an LCoS display 404. Light L from the light engine 100/200 is transmitted through the first PBS 402 to the display 404 which generates an image I. The image I may be provided from the display 404 to the PBS 402, which guides the images to a lens 406, which focuses the image towards a second PBS 408. The image I may be reflected by the second PBS 408 towards a viewer. In some embodiments, the device 400 may be configured to reflect the image I onto an eye 412 of the viewer.

Light A from the ambient environment may pass through the second PBS 408 and reach the eye 412. Accordingly, the image I may be overlaid on an image formed from the ambient light A. In some embodiments, the device 400 may also include tracking and focusing devices configured to track the eye 412 and make corresponding focusing adjustments to insure that the image I is properly focused on the eye 412.

Figure 5:
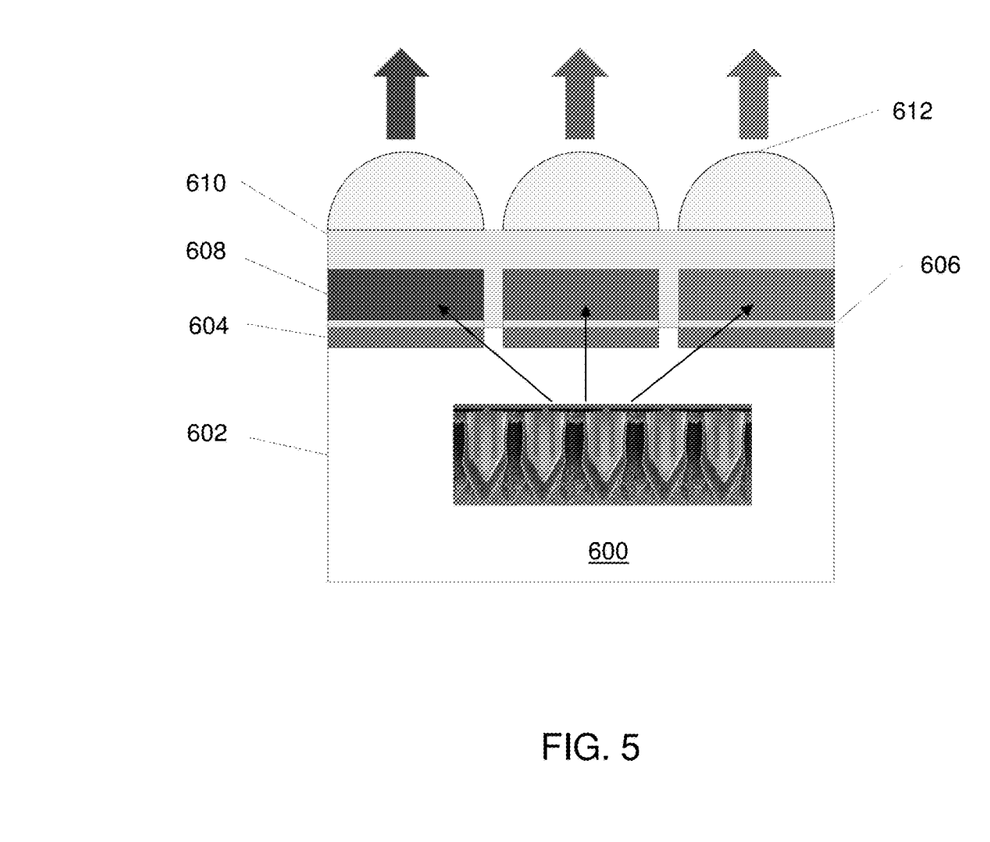
FIG. 5 is a schematic view of a light engine, according to various embodiments of the present disclosure.

FIG. 5 is a vertical cross-sectional view of a micro-lensed light engine 600, according to various embodiments of the present disclosure. Referring to FIG. 5, the light engine 600 may include LEDs 608 disposed a backplane 602. In some embodiments, conductive layers 606 may be disposed on the backplane 602 under each LED 608. The backplane 602 may be substantially rigid backplane formed of, for example, a silicon or glass material. In other embodiments, the backplane 602 may be flexible backplane formed of, for example, a polymer material.

In some embodiments, the backplane 602 may be a passive backplane (e.g., does not actively control the LEDs 608). In other embodiments, the backplane 602 may be an active backplane including driving circuitry 604, such as TFTs of the like, configured to individually drive the light emitting devices 608. The conductive layers 606 may be configured to electrically connect the driving circuitry 604 to each light emitting device 608.

In some embodiments, the LEDs 608 may be nanowire LEDs or the like. However, the present disclosure is not limited to any particular type of LED. The LEDs 608 may emit different colors of light. For example, the light engine 600 may include red, green, blue, yellow, and/or white LEDs 608. Further, in some embodiments, the LEDs 608 may be other types of light emitting elements. While the light engine 600 is shown to include three LEDs, the present disclosure is not limited to any particular number of LEDs 608.

The LEDs 608 may be encapsulated by an encapsulating layer 610. For example, the encapsulating layer may be formed of a transparent or substantially transparent material, such as silicone or the like. The light engine 600 may also include micro-lenses 612 disposed above the LEDs 608. The lenses 612 and the encapsulation layer 610 may be formed of the same or different transparent or substantially transparent materials.

In some embodiments, the light engine 600 may be configured such that each lens 612 collects substantially all of or a majority of the light emitted from a corresponding LED 608. In particular, each lens 612 may collect from about 75% to about 99.9% of light emitted from a corresponding LED 698. For example, the size of each LED 608, the pitch therebetween, the size of the lens 612, and the thickness and/or refractive index of the encapsulation layer 610 may be controlled, such that substantially all of the light emitted from each LED 608 is collected by a corresponding lens 612. The emitting center of each LED 608 may be aligned with the center of the corresponding lens 612, in order to provide a relatively high level of light collimation and/or a relatively high LED lumen to irradiance ratio.

The light engine 600 may include an array of the LEDs 608. Since the light of each LED 608 is focused by a corresponding lens, each LED 608 may operate as a sub-pixel of the light engine 600. Therefore, the light engine 600 may directly display an image by independently driving each LED 608. In other words, the light engine 600 may be a display element of direct emission display device, e.g., a display device that does not rely upon an additional light control layer, such as an LCD layer, since the light engine 600 may operate as a light source and a light control layer.

Figures 6A, 6B:
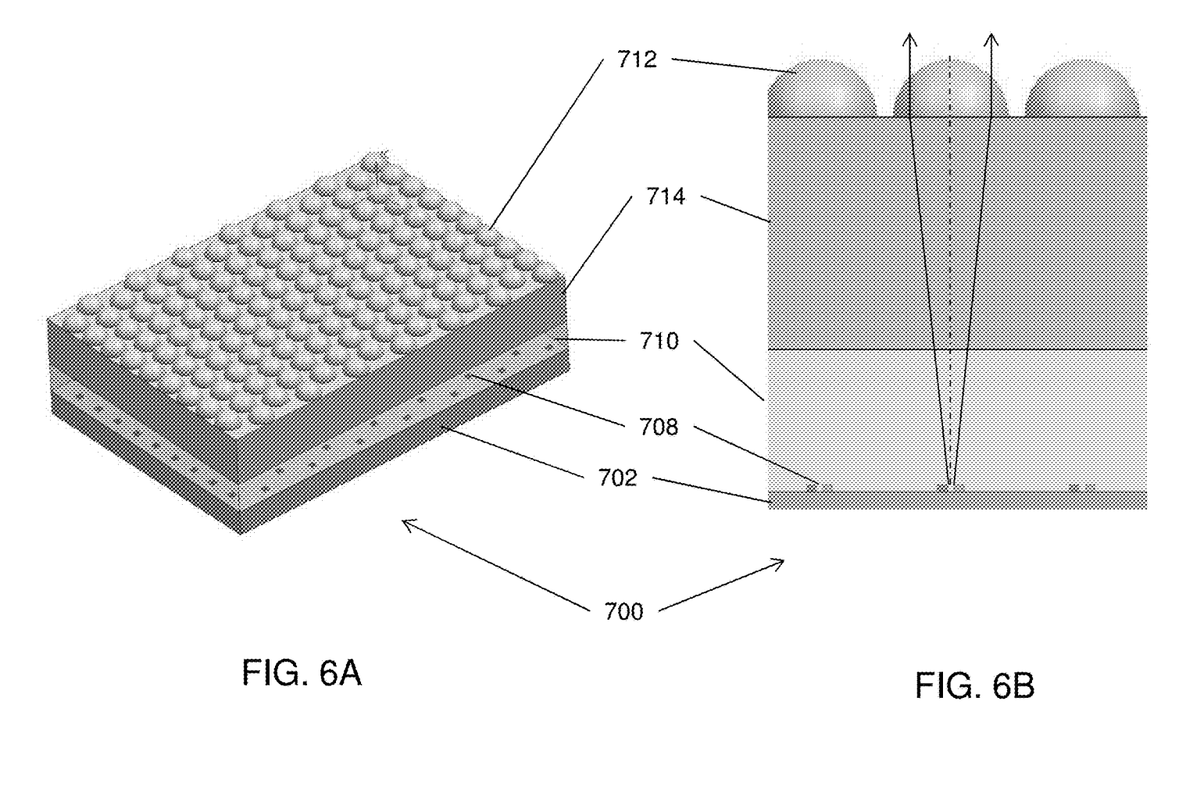
FIG. 6A is a perspective view of a micro-lensed light engine, according to various embodiments of the present disclosure.
FIG. 6B is a vertical cross-sectional view of a portion of the light engine of FIG. 6A.

FIG. 6A is a perspective view of a micro-lensed light engine 700, according to various embodiments of the present disclosure, and FIG. 6B is a vertical cross-sectional view of a portion of the light engine 700. The light engine 700 is similar to the light engine 600, so only the differences therebetween will be discussed in detail.

Referring to FIGS. 6A and 6B, the light engine includes a backplane 702 upon which LEDs 708 are disposed. Although not shown, the backplane 702 may include conductive layers and/or LED driving circuitry. The LEDs 708 may be arranged on the backplane 702 in pixel groups, with each pixel group including, for example, three or four LEDs of different colors. An encapsulation layer 710 may be disposed on the backplane 702, so as to encapsulate the LEDs 708. An interlayer 714 may be disposed on the encapsulation layer 710, and micro-lenses 712 may be disposed on the interlayer 714. In one embodiment, the interlayer and the micro-lenses are made of the same material and the micro-lenses 712 comprise protrusions formed in the top surface of the interlayer 714.

The interlayer 714 and/or the lenses 712 may be configured to collimate Lambertian light emitted from the LEDs 708, such that an emission angle of light emitted from the light engine 700 (e.g., from the lenses 712) is smaller than an emission angle of light emitted from the LEDs 708. The emitting center of each LED 708 and/or pixel group may be aligned with or around the center of the corresponding lens 712, in order to provide a relatively high level of light collimation and/or a relatively high LED lumen to irradiance ratio. In contrast to the light engine 600, the light engine 700 may be configured such that each lens 712 receives substantially all of the light from multiple LEDs 708, such as the light emitted from the LEDs 708 of a corresponding pixel group (e.g., containing one or more of each of red, green and blue emitting LEDs 708). However, in other embodiments, the light engine 700 may be configured such that each lens 712 receives at least about 75% of the light emitted from only one of the LEDs 708.

The emission angle, light collimation, and/or irradiance ration of the light engine 700 may be controlled by adjusting the size of the LEDs 708, the pitch of the LEDs 708 (e.g., the distance between adjacent pixel groups), the size of the lenses 712, the refractive index of the encapsulation layer 710 and/or the interlayer 714, and/or the distance between the LEDs 708 and the lenses 712.

Figure 7A:
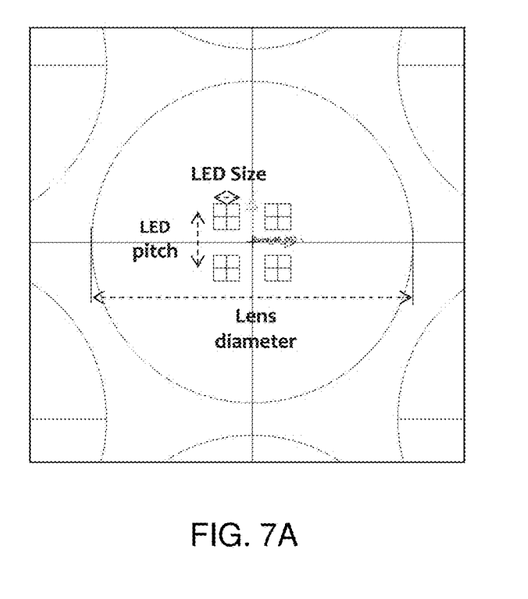
FIG. 7A is a top plan view of a micro-lensed light engine, according to various embodiments of the present disclosure.
Figure 7B:
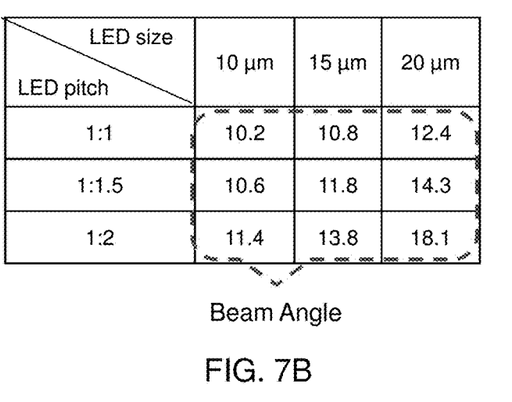
FIG. 7B is a chart showing emission angles produced by varying the pitch and size of LEDs included in the light engine of FIG. 7A.
Figure 7C:
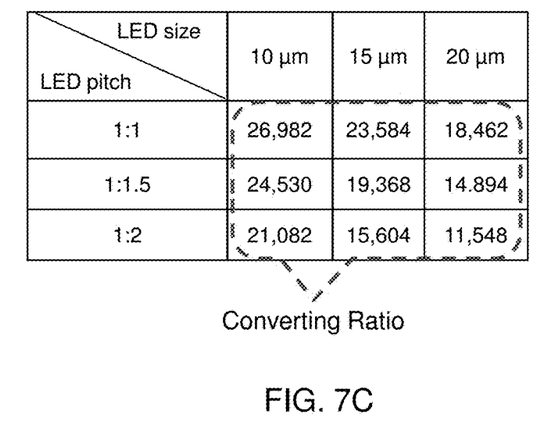
FIG. 7C is a chart showing luminance to LED input lumen ratios produced by varying the pitch and size of LEDs included in the light engine of FIG. 7A.

FIG. 7A is a top plan view of a micro-lensed light engine 800, according to various embodiments of the present disclosure. FIG. 7B is a chart showing emission angles produced by varying the pitch and size of LEDs included in the light engine 800, and FIG. 7C is a chart showing luminance to LED input lumen ratios produced by varying the pitch and size of LEDs included in the light engine 800. The light engine 800 is similar to the light engine 700, so only the differences therebetween with be discussed in detail.

Referring to FIG. 7A, the light engine 800 includes an array of lenses 812, with each lens 812 disposed over a pixel group of four LEDs 808 (e.g., one red emitting, two green emitting and one blue emitting LEDs 808). In particular, the LEDs 808 of each pixel group may be arranged equidistantly around a line that extends from the center of a corresponding lens 812. In other words, an emitting center of the LEDs 808 may be aligned with the center line of the lens 812.

As can be seen in FIG. 7B, the beam angle of light emitted from the lens 812 may be adjusted by tuning the size and pitch of LEDs 808 disposed under the lens 812. As can be seen in FIG. 7C, a converting ratio may be increased by tuning the size and pitch of LEDs 808 disposed under the lens 812.

In one non-limiting example, the LED pitch may vary from 1:1 to 1:2 and the LED size may vary from 10 to 20 microns. The resulting beam angle may vary from about 10 to 20, such as from 10.2 to 18.1, and the resulting converting ratio may vary from about 11,000 to about 27,000, such as from 11,548 to 26,982.

The light engines of FIGS. 5 to 7C can be used in any suitable device or system, such as the direct view display devices described above with respect to FIGS. 3 and 4, in a LCOS (liquid crystal on silicon) device or for direct lit application (i.e., as a direct lit backlight) to illuminate a liquid crystal display (LCD).

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. Where an embodiment employing a particular structure and/or configuration is illustrated in the present disclosure, it is understood that the present invention may be practiced with any other compatible structures and/or configurations that are functionally equivalent provided that such substitutions are not explicitly forbidden or otherwise known to be impossible to one of ordinary skill in the art.

What is claimed is:

1. A light engine, comprising:
   a housing comprising a rectangular aperture;
   a polarizer disposed in the housing facing the aperture;
   a micro-lensed, light emitting device disposed in the housing; and
   a light guide comprising a collimating lens and configured to guide light emitted from the LED array toward the aperture, such that light is emitted through the aperture,
   wherein the micro-lensed, light emitting device comprises:
   a backplane disposed on the housing;
   a two-dimensional array of pixel groups disposed on the backplane, each pixel group including light emitting diodes (LEDs) emitting light of different colors and spatially spaced apart among one another;
   an encapsulation layer having a first refractive index and encapsulating the LEDs and continuously extending over each pixel group within the two-dimensional array of pixel groups;
   an interlayer having a second refractive index and continuously extending over the encapsulation layer and the two-dimensional array of pixel groups; and
   a two-dimensional array of micro-lenses disposed on the interlayer and configured to direct light from the two-dimensional array of pixel groups to the collimating lens, wherein:
   the two-dimensional array of micro-lenses is arranged with a two-dimensional pattern such that each LED within any given pixel group is equidistant from a center line of a respective overlying micro-lens that directly overlies the given pixel group; and
   the encapsulation layer, the interlayer, and the two-dimensional array of micro-lenses are configured to provide an emitting center for any given pixel group that is aligned with the center line of the respective overlying micro-lens and to reduce an emission angle for light that is emitted from each pixel group within the two-dimensional array of pixel groups and exits toward the collimating lens as substantially parallel beams along a direction substantially perpendicular to a top surface of the backplane.

2. The light engine of claim 1, wherein the housing comprises a bottom and an open top, and a cover disposed on the top of the housing and comprising the rectangular aperture.

3. The light engine of claim 2, wherein the polarizer comprises a polarizer sheet.

4. The light engine of claim 3, wherein the light engine comprises a direct lit light engine.

5. The light engine of claim 4, wherein:
   the LED array is disposed on the bottom of the housing; and
   the light guide comprises a collimating lens disposed in the housing between the LED array and the polarizing sheet.

6. The light engine of claim 5, wherein the cover is configured to mask light output from the polarizing sheet, such that a substantially rectangular light spot is emitted by the light engine.

7. The light engine of claim 3, wherein the light engine comprises an edge lit light engine.

8. The light engine of claim 7, wherein the light guide comprises:
   a reversed Fresnel lens as the collimating lens; and
   a triangular prismatic main body comprising a first surface that faces the Fresnel lens, a third surface that is substantially perpendicular to the first surface, and a second surface configured to reflect light transmitted through the first surface towards the third surface.

9. The light engine of claim 8, wherein the second surface comprises indentations configured to reflect light toward the third surface.

10. The light engine of claim 8, wherein:
    the reversed Fresnel lens is configured to collimate light received from the LED array onto the first surface of the main body; and
    the LED array is disposed on a sidewall of the housing.

11. The light engine of claim 8, wherein the third surface comprises a coating or surface features configured to increase light extraction from the main body.

12. The light engine of claim 3, wherein:
    the cover comprises supports extending from corners thereof;
    the light guide comprises a lip disposed on an upper edge of the housing; and
    portions of the lip are disposed in openings formed between the supports.

13. The light engine of claim 1, wherein the LED array comprises LEDs that emit red, green, and blue light.

14. The light engine of claim 1, wherein the aperture is square shaped.

15. The light engine of claim 1, wherein the light source has:
- a height ranging from about 5 mm to about 20 mm; and
- a length and width ranging from about 10 mm to about 30 mm.

16. A display device comprising an imager and the light engine of claim 1.

17. The display device of claim 16, wherein the display device comprises smart glasses.

18. The display device of claim 16, wherein the display device comprises virtual reality goggles.

19. A projector device comprising an imager and the light engine of claim 1.

20. The projector device of claim 19, wherein the projector device comprises a pico-projector.

21. The light engine of claim 1, wherein the micro-lensed, light emitting device is configured such that each micro-lens receives at least 75% of light emitted from a respective one of the LEDs.

22. The light engine of claim 1, wherein the micro-lensed, light emitting device is configured such that each micro-lens receives at least 75% of light emitted from a respective set of at least three of the LEDs.

* * * * *